United States Patent [19]

Harvey, Jr. et al.

[11] 3,743,096
[45] July 3, 1973

[54] FILTER ADAPTER

[76] Inventors: Galen E. Harvey, Jr., 339 E. Terrace; Gary C. Petty, 4872 N. Doon Way, both of Fresno, Calif.

[22] Filed: Mar. 6, 1972

[21] Appl. No.: 232,067

[52] U.S. Cl.................. 210/232, 210/440, 210/444, 210/DIG. 17
[51] Int. Cl............................................ B01d 27/00
[58] Field of Search.................... 210/232, 440, 444, 210/DIG. 17

[56] References Cited
UNITED STATES PATENTS

| 2,622,737 | 12/1952 | Balley | 210/DIG. 17 |
| 2,633,991 | 4/1953 | Beatty | 210/DIG. 17 |
| 2,937,756 | 5/1960 | Humbert Jr. | 210/444 |
| 3,069,015 | 12/1962 | Hultgren et al. | 210/232 |
| 3,197,029 | 7/1965 | Yelinck et al. | 210/DIG. 17 |

Primary Examiner—Samih N. Zaharna
Assistant Examiner—Richard W. Burks
Attorney—Herbert A. Huebner, Richard M. Worrel et al.

[57] ABSTRACT

An adapter for converting a filter system, having a source of fluid to be filtered and a discharge for filtered fluid, from use with a canister-type filter element to use with a disposable-type filter element, the adapter having a first coupling adapted for connection to the source; a base mounted on the coupling; a second coupling mounted on the base remote from the first coupling and adapted to receive a disposable-type filter element thereon, said element having a discharge opening for sealed attachment to the second coupling and a separate and distinct entrance opening; an input conduit operably interconnecting the first coupling and the entrance opening; and an output conduit operably interconnecting the second coupling and the discharge of the filter system.

8 Claims, 4 Drawing Figures

FILTER ADAPTER

BACKGROUND OF THE INVENTION

The present invention relates to a filter adapter and more particularly to such an adapter which permits the rapid conversion of a conventional canister-type filter system for use with a disposable-type element so as to facilitate maintenance of the filter system in the optimum working condition at reduced expense and labor.

Many types of engine filter systems, such as for gasoline, air, oil, diesel fuel and the like, are designed for use with a canister-type filter element. Particularly in full flow oil filter systems such canister-type filter elements are employed for the filtering of oil. Typically, such systems have an element mount providing a central input conduit surrounded by an oil return sump. The canister-type element is fitted onto the mount in communication with the input conduit. The element is secured in position on the mount by a rather complicated system of gaskets, washers, springs, and bolts. During operation, the oil is pumped upwardly through the center of the element and discharged at the top thereof for filtering downwardly through the element so that the filtered oil is collected in the sump for subsequent reuse.

Periodically, as the element becomes clogged with residue from the filtering process, the element must be replaced which necessitates disassembly of the rather complicated mounting system. Because of the lubricity of the oil, washers, springs and other parts are frequently dropped and lost. Because such systems are sold only in complete units, the loss necessitates replacement of the entire mounting system, as well as the element. This is, of course, aggravating, expensive, and time-consuming. Furthermore, such elements are frequently improperly mounted due to their complexity, thus causing leakage and inadequate filtering of the oil pumped therethrough.

Presently available disposable-type filter elements are much more convenient in that they need only be unthreaded from the mount of the filter system and replaced with a new element. Since there are no springs, washers, or the like, there is nothing of that sort to become lost and thus, such replacement is rapid, inexpensive and efficient. Furthermore, since such disposable-type filter elements are so easily installed, there is much less of a tendency to forestall replacement of the element in order to avoid the aggravations and inefficiencies of the canister-type filter elements. Experience teaches that because of this, such filter systems are maintained in optimum working condition in more instances than those having the canister-type filter element.

In the past, the only method for converting one type filter system to the other was to replace the entire filter system including the mount. Such a procedure is costly and time-consuming.

Therefore, it has long been recognized as desirable to have an adapter which would readily convert one type of filter system to the other without the necessity of replacement of the entire filter system.

SUMMARY OF THE INVENTION

Therefore, it is an object of the present invention to provide a filter adapter which readily converts a full flow canister-type filter system to a disposable-type filter system.

Another object is to provide such an adapter which is particularly suited for use in oil filter systems.

Another object is to provide such an adapter which facilitates installation on an element mount of a conventional filter system.

Another object is to provide such as adapter which converts such a filter system for permanent use with a disposable-type filter element.

Another object is to provide such an adapter which permits reconversion of the filter system for use with a canister-type filter element, if desired.

Another object is to provide such an adapter which permits the avoidance of the aggravation and expense of replacing canister-type filter elements.

Another object is to provide such an adapter which converts the path of travel of oil fed to and from the filter element from that adapted for use with a canister-type filter element to that adapted for use with a disposable-type filter element.

A further object is to provide such an adapter which precludes the inadvertent spilling of oil during the replacement of a filter element.

A still further object is to provide such an adapter which permits the conversion of a wide variety of types of filter systems.

Further objects and advantages are to provide improved elements and arrangements thereof in a device for the purposes described which is dependable, economical, durable and fully effective in accomplishing its intended purposes.

DESCRIPTION OF THE FIRST EMBODIMENT

Figure 1:
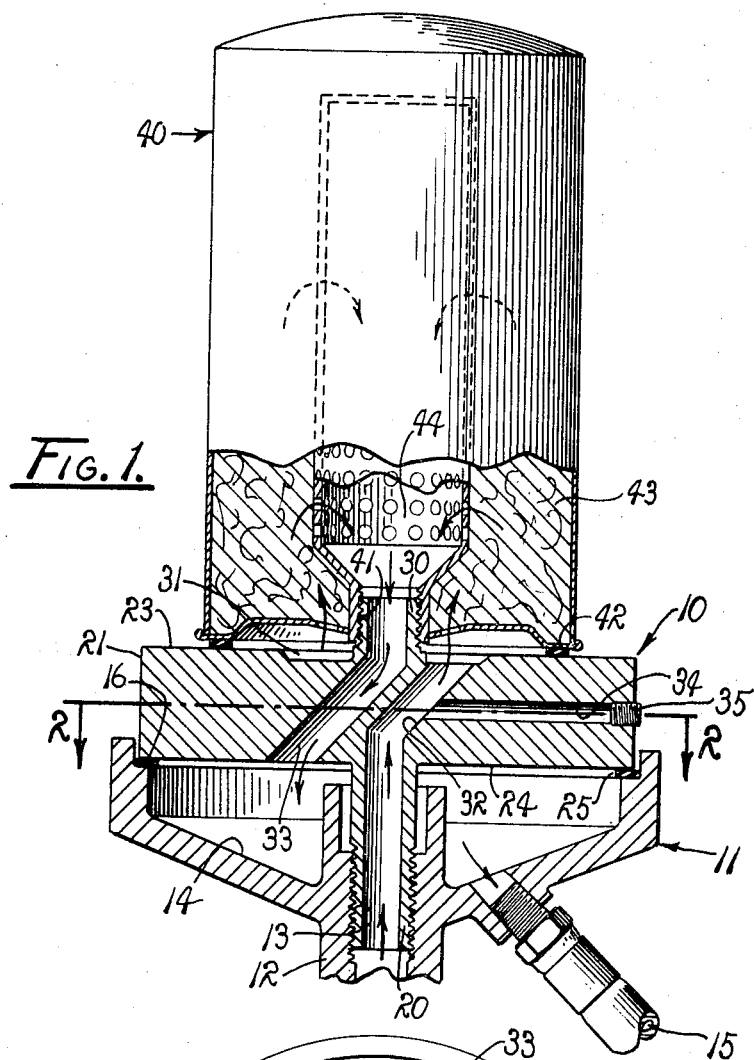
FIG. 1 is a vertical section of the filter adapter of the present invention shown operably received on an element mount and mounting a disposable-type filter element thereon.
Figure 2:
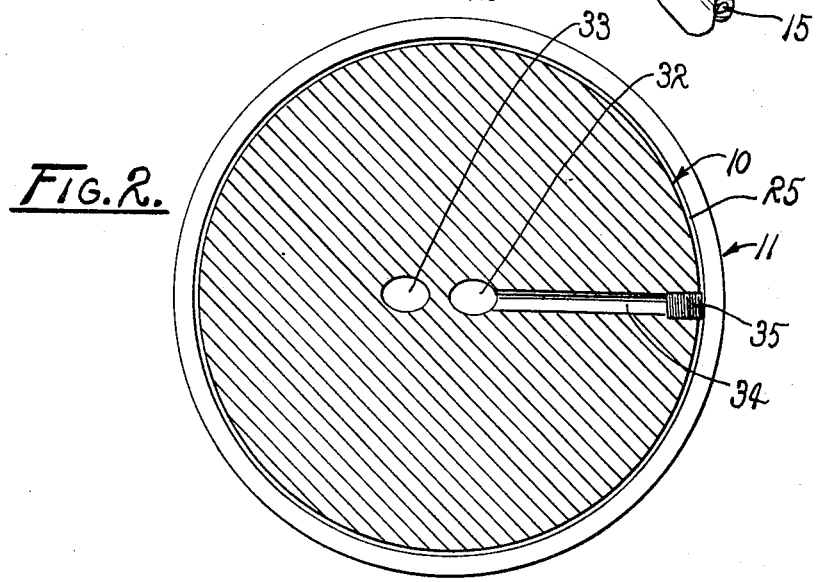
FIG. 2 is a horizontal section taken at the position represented by line 2—2 of FIG. 1.

Referring more particularly to the drawings, FIG. 1 shows the filter adapter of the first form of the present invention generally indicated by the numeral 10. The filter adapter possesses the capability of being used in a wide variety of types of filter systems including sysems for filtering air, gasoline, diesel fuel and the like. However, for illustrative convenience, the adapter is shown and described for use in an oil filter system, the environment which inspired its conception. As shown in FIGS. 1 and 2, the adapter is mounted in operable position on a conventional filter element mount 11 having a centrally disposed upwardly extending input conduit 12 with an internally threaded portion 13. The conduit is in operable connection to an engine, not shown, for the supply of oil to be filtered to the filter system. The mount has an oil sump 14 integrally provided about the input conduit of the mount and operably connected to a discharge conduit 15. The conduit leads back to the engine for re-supplying filtered oil thereto. The mount has a ledge or seat 16 extending concentrically about the input conduit adjacent to the periphery of the mount. The filter system has a normal direction of flow of oil for filtering extending through the input conduit, upwardly through the canister-type filter element, not shown, in axial alignment with the input conduit and subsequently downwardly through the element adjacent the periphery thereof. The filtered oil is then received in the sump and transferred to the engine by way of the discharge conduit.

The adapter 10 has an externally threaded first coupling 20 which is adapted to be received in the internally threaded portion 13 of the input conduit 12. A cylindrical base 21 is integrally provided on the first coupling so that the coupling is centrally disposed thereto. The base has parallel mounting and seating surfaces 23 and 24, respectively, which are normal to the axis defined by the first coupling. When installed on the mount 11, a gasket 25 is disposed on the seat 16 thereof and the coupling threaded into the threaded portion of the conduit so that the seating surface of the base is secured in fluid tight sealing relation against the seat with the gasket disposed there-between.

An externally threaded second coupling 30 is integrally provided in upwardly extending relation from the mounting surface 23 of the base 21 in axial alignment with the first coupling 20. A deprssion 31 is provided in the upper surface of the base extending concentrically about the second coupling. An input passage 32 is provided in the base and operably interconnects the first coupling and therefore the input conduit 12 of the mount 11 with the depression of the base. An output passage 33 is provided in the base operably connecting the second coupling with the sump 14 of the mount. A drain tap or passage 34 is provided in the base extending radially from the input passage to the periphery of the base. A drain plug 35 is threadably secured in the drain passage at the periphery of the base.

As shown in FIG. 1, a disposable filter element 40 having a centrally threaded portion 41 is mounted for operational use on the mounting surface 23 of the base 21 with the second coupling 30 threadably received in the centrally threaded portion. A gasket 42 is provided between the filter element and the mounting surface of the base so as to maintain the element in fluid tight sealing relation on the base when the element is tightened into position. The gasket circumscribes the depression 31. The filter element has a cylindrical outer passage 43 and a central cylindrical inner passage 44. The element is filled with filtering material of any desired type of cake, pad, bag, plug, membrane, bed, cloth, or the like.

DESCRIPTION OF THE SECOND EMBODIMENT

Figure 3:
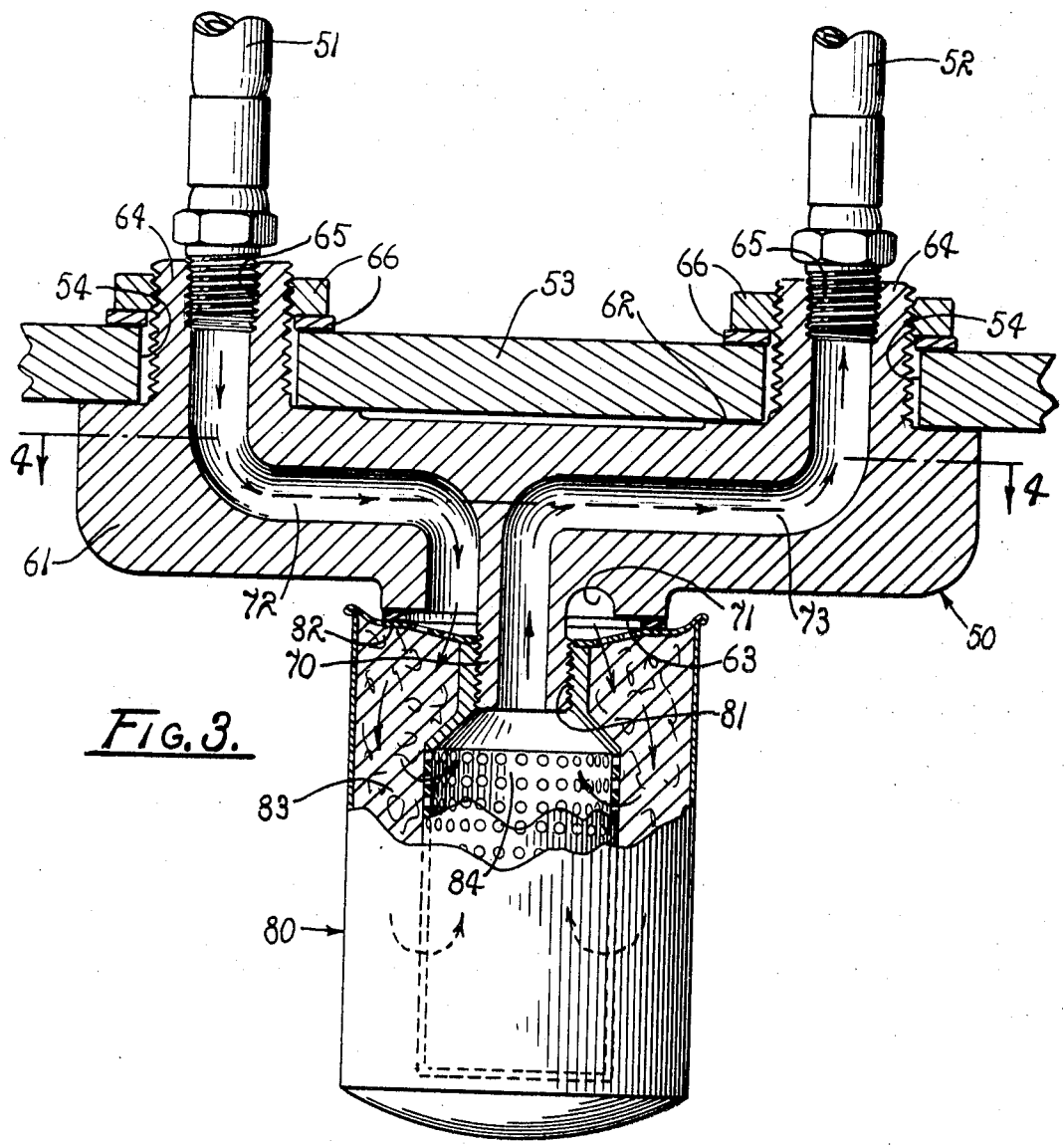
FIG. 3 is a longitudinal vertical section of a second form of filter adapter.
Figure 4:
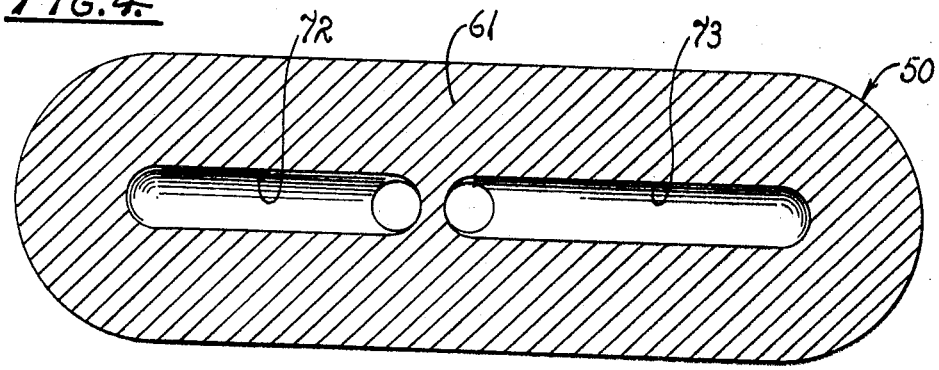
FIG. 4 is a horizontal section taken at the position represented by line 4—4 of FIG. 3.

A second form of filter adapter is shown in FIGS. 3 and 4, generally indicated by the numeral 50. This type of adapter is also designed to convert a canister-type filter system for use with a conventional disposable-type filter element. It is specifically designed for conversion of certain types of canister filter systems appearing on industrial-type diesel engines in which the canister is entirely self-contained and is connected to the engine through a flexible input hose 51 and output hose 52. In its operational configuration, the adapter is mounted on an engine housing 53. Such mounting is accomplished by drilling a pair of bores 54 in spaced relation to each other in the housing at any suitable location, such as shown in FIG. 3.

The adapter 50 has a substantially elliptical base 61 having a seating surface 62 and a mounting surface 63. A pair of externally threaded first couplings 64 are integrally provided on the seating surface and extend outwardly therefrom in spaced relation. Each of the first couplings has an internally threaded portion 65. The adapter is mounted on the engine housing 53 by the receipt of the first couplings through the bores 54 and the securing of mounting assemblies 66 about the couplings, as best shown in FIG. 3, to secure the seating surface in facing engagement with the housing. The input hose 51 and the output hose 52 are individually screw-threadably secured in the threaded portions of their respective first couplings, as will subsequently be described.

An externally threaded second coupling 70 extends from the mounting surface 63 of the base 61. A depression 71 is formed in the mounting surface concentrically about the second coupling. An input passage 72 is provided in the base operably interconnecting the first coupling 64 in connection with the input hose 51 with the depression. An output passage 73 extends through the base in operable connection between the first coupling in connection with the output hose 52 and the second coupling.

A conventional disposable filter element 80 having a centrally threaded portion 81 is operably secured on the mounting surface 63 of the base 61 with the threaded portion screw-threadably received on the second coupling 70. A gasket 82 is provided circumferentially about the second coupling between the filter element and the mounting surface of the base so as to maintain the element in fluid tight sealing relation on the surface. The disposable filter element has a cylindrical outer passage 83 and a centrally disposed inner passage 84. The element is formed of any desired filtering material.

OPERATION

The operation of both embodiments of the subject invention is believed to be clearly apparent and is briefly summarized at this point. Conversion of a canister-type filter system having a filter element mount 11 is accomplished by first removing the canister-type element and associated mounting parts such as springs, washers, gaskets and the like. Thus, all that remains of the filter system is the mount, as shown in FIG. 1. The first coupling 20 of the adapter 10 is then screw-threadably received in the internally threaded portion 13 of the input conduit 12. The adapter is tightened down so as to retain the gasket 25 in fluid tight sealing relation between the seating surface 24 and the seat 16 of the mount. A disposable filter element 40 is then screw-threadably secured on the mounting surface 23 of the base 21 with the gasket 42 secured in fluid tight sealing relation therebetween, as best shown in FIG. 1.

With the adapter 10 secured in position and the filter element 40 operably mounted thereon, as described, the filter system is fully converted and ready for use. During operation, oil for filtering is pumped by oepration of an oil pump, not shown, through the input conduit 12, the input passage 32 and upwardly through the outer passage 43 of the element 40 for filtering. Subsequently, the oil is filtered downwardly through the inner passage 44 of the element and passes through the output passage 33 and into the oil sump 14 of the mount 11 for subsequent discharge through the discharge conduit 15. It will be noted that the adapter reverses the normal direction of flow through the filter element received thereon. Thus, the direction of the flow of oil for filtering is quickly and easily converted from that used with a canister-type filter element to that used with a disposable-type filter element.

In order to insure otimum operation of the filter system, the disposable filter element 40 should periodically be replaced. To preclude the discharge of oil over the engine during such replacement, the drain plug 35 should be removed from the cylindrical base 21 prior to replacement of the element. This allows accumulated oil in the element and input passage 32 to be drained through the drain passage 34 for collection therebelow without leakage over the engine. Subsequently, the disposable filter element is simply unthreaded from the second coupling 30 and replaced with a fresh filter element secured on the base in the above described manner.

It should be noted that once installation of the filter adapter 10 has been accomplished, the conversion of the filter system from use with the canister-type filter element to use with the disposable-type filter element is permanent and there is no need thereafter to replace or adjust the adapter. However, if it is desired to reconvert the filter system for use with a canister-type filter element, this can quickly and simply be accomplished by removal of the adapter and reassembly of the canister-type filter element and its mounting elements on the mount 11.

Operation of the second embodiment of the subject invention is substantially as described in regard to the first embodiment of the invention. As already described, the filter adapter 50 of this embodiment of the invention is particularly adapted for use in converting certain types of industrial diesel engines using self-contained canister-type filter systems. Conversion is accomplished by removal of the canister filter system from the engine and disconnecting the input hose 51 and output hose 52 therefrom.

Subsequently, bores 54 are drilled in an appropriate position in the engine housing 53 in predetermined spaced relation to each other. The first couplings 64 of the base 61 are then individually received in the bores and the mounting assemblies 66 screw-threaded thereabout to mount the base on the housing, as shown in FIG. 3. The input and output hoses are threadably received in the internally threaded portions 65 of the couplings so that the input hose is in connection with the input passage 72 and the output hose is in connection with the output passage 73. A disposable-type filter element 80 is then mounted on the second coupling 70 of the base 61 so that the gasket 82 is retained in fluid tight sealing relation between the element and the mounting surface 63 of the base.

Thus, during operation of the engine, oil to be filtered is pumped through the input hose 51, the input passage 72 and downwardly through the outer passage 83 of the element 80 for filtering. The oil is subsequently filtered upwardly through the inner passage 84, and the output passage 73, and discharged through the output base 52 for reuse in the engine.

As with the filter adapter 10 of the first embodiment of the invention, the filter adapter 50 permits quick removal and replacement of disposable filter elements so as to maintain the filtering system in optimum working condition. Furthermore, the initial mounting of the adapter is permanent so that no further mounting or adjustment of the adapter is necessary during subsequent use of the engine and replacement of the filter elements. The adapter may, of course, be removed as with adapter 10 so as to permit reconversion of the filter system to use with a canister-type element, if so desired.

Therefore, both embodiments of the present invention permit the rapid conversion of conventional canister-type filter systems for use with a disposable filter element so as to facilitate maintenance of the filter system in optimum working condition at reduced expense and labor. It should also be noted that the adapter possesses the capability of being modified so as to handle filtering not only of oil but also of gasoline, diesel fuel, air, and the like in all types of engines.

Although the invention has been herein shown and described in what are conceived to be the most practical and preferred embodiments, it is recognized that departures may be made therefrom within the scope of the invention, which is not to be limited to the illustrative details disclosed.

Having described our invention, what we claim as new and desired to secure by Letters Patent is:

1. An adapter for converting a filter system, having a pressurized source of fluid to be filtered, comprising first coupling means secured to the source in fluid receiving relation; a base mounted on the first coupling means; a second coupling provided on the base and adapted to receive a filter element; and fluid transfer means operably interconnecting the first coupling means and the second coupling so as to transfer fluid under pressure from the source for filtering to and from an element mounted on the second coupling.

2. The adapter of claim 1 in which the transfer means has an input passage extending through the base for the transfer of fluid to the element and a distinct output passage extending through the base for the transfer of fluid from the element so as to establish a single directional flow of fluid to and from the element in an opposite direction to that normally utilized in the filter system.

3. The adapter of claim 2 in which the first coupling means includes an input coupling mounted on the base in operable connection to the source for transfer of fluid to be filtered from the source to the input passage and an output coupling mounted on the base in operable connection to the source for transferring filtered fluid from the output passage to the source for subsequent reuse.

4. An adapter for converting a canister-type oil filter element mount, connected to a source of oil to be filtered, for use with a disposable-type filter element, the adapter comprising a first coupling adapted for connection to the mount; a base mounted in operable connection to the first coupling and adapted for sealed engagement on the mount so as to form a sump with the mount, a second coupling extending from the base adapted for operable connection to a disposable-type filter element, and oil transfer means interconnecting the first and second couplings for the transfer of oil to and from the element for filtering of the oil.

5. The adapter of claim 4 in which the oil transfer means has an intake passage interconnecting the source and the element and a distinct discharge passage interconnecting the element and the sump so as to establish a single directional flow of oil through the disposable element for filtering and to the sump for subsequent reuse.

6. The adapter of claim 5 in which a drain tap is provided in the adapter for discharging residual oil from the disposable element and adapter prior to replacing the disposable element preclude prelude the unwanted discharge of such residual oil during replacement of the disposable element.

7. An adapter comprising a base having opposite sides and an inlet passage and an outlet passage extended therethrough, the inlet passage having a screw-threaded coupling at one side of the base and an open end at the opposite side and the outlet passage having a screw-threaded coupling at said opposite side and an open end at said one side, the couplings being axially aligned and the open ends being eccentric thereto, and annular seats on the opposite sides thereof concentric to the couplings and each circumscribing a coupling and an adjacent open end.

8. An adapter, for converting a canister-type filter system including a mount having an annular seat, a screw-threaded input conduit substantially concentric to the seat and a discharge conduit disposed between the seat and the input conduit, comprising:
 a. a base having a nipple for screw-threaded engagement with the input conduit and an annular surface disposed toward the seat;
 b. a gasket disposed against the annular surface of the base for fluid tight engagement with the seat when the nipple is tightened into the input conduit,
   1. the base having an input passage extended through the nipple for communication with the input conduit and providing an opposite end,
   2. an outlet passage extended through the base for communication with the discharge conduit providing an opposite end having a screw-threaded coupling, and
   3. an annular mounting surface circumscribing said opposite ends substantially concentric to the coupling;
 c. a disposable filter element screw-threadably engaged with the coupling having
   1. an outlet in communication with the outlet passage,
   2. an inlet in communication with the inlet passage, and
   3. an annular face circumscribing the inlet and outlet substantially concentrically of the outlet in juxtaposition with the annular mounting surface of the base; and
 d. a gasket disposed between the juxtaposed face and mounting surface for fluid tight compression therebetween when the filter element is tightened on the coupling.

* * * * *